April 5, 1966 W. E. RHODES ETAL 3,244,831
WATER LEVEL PRESSURE SWITCH WITH POSITIVE SPRING RESET MEANS
Filed April 8, 1964 2 Sheets-Sheet 1

*INVENTORS*
WILLIAM E. RHODES
BY WERNER R. BAUER

THEIR ATTORNEYS

April 5, 1966 W. E. RHODES ETAL 3,244,831
WATER LEVEL PRESSURE SWITCH WITH POSITIVE SPRING RESET MEANS
Filed April 8, 1964 2 Sheets-Sheet 2

INVENTORS
WILLIAM E. RHODES
WERNER R. BAUER
BY
Cauder & Cauder
THEIR ATTORNEYS

United States Patent Office 3,244,831
Patented Apr. 5, 1966

3,244,831
WATER LEVEL PRESSURE SWITCH WITH
POSITIVE SPRING RESET MEANS
William E. Rhodes and Werner R. Bauer, Columbus,
Ohio, assignors to Robertshaw Controls Company,
Richmond, Va., a corporation of Delaware
Filed Apr. 8, 1964, Ser. No. 358,299
9 Claims. (Cl. 200—83)

This invention relates to a condition responsive energy controller and method.

More specifically this invention relates to a fluid pressure responsive member which controls electrical energy by the operation of a switch. The pressure responsive member may be responsive to air pressures produced, for example, by the height of the water in a washing machine tub, and the switch may control the operation of the washing machine timer, the washing machine control valve, and other members desired to be controlled.

For example, when the invention is applied to a water level switch for a washing machine, such water level controller is made responsive to the height of the water which is supplied to the hub of the washing machine. The controller is provided with adjusting can means which has a plurality of selectable upper water level limit positions, which cause the switch to be actuated to turn off the water valve construction in response to different upper water levels, so that the tub is filled only to the selected upper water level. For example, the water is turned off by the switch when the water level reaches any one of three selectable upper level positions which are generally termed "low," "medium" and "high."

A problem arises when the user of the washing machine has adjusted the water level controller for the "low" position and the tub has filled to such selected "low" position and has caused the switch to be actuated and the water to be turned off. However, if the user then desires a higher water level, and adjusts the cam means to "medium" or "high," then the switch must be "reset" before more water can be added to the tub. Some previous switches do not respond in this manner and do not allow the water control valve to be opened by the switch, since the switch will not snap back to the "reset" or fill position, but will remain at the actuated switch position which keeps the water valve closed. Water level switches have been provided, however, which do reset the switch when the cam is adjusted from "low" to "medium" or "high," or from "medium" to "high." The present invention concerns such type of switch, and the invention provides an improved construction and method of obtaining the resetting of the switch when the adjusting means is adjusted from a lower to an upper position under conditions of the character just described.

According to this invention, a single spring structure is provided which produces an effective and positive resetting of the switch under the above conditions. The single spring has spring coils which remains separated to adjust the switch for obtaining the desired upper levels of fill.

However, the spring coils contact each other and positively reset the switch when the adjustment is changed after the tub has filled, as previously described, to open the water valve and allow the desired additional water to be added to the tub.

Other features are apparent from this description, the appended claimed subject matter, and/or the accompanying drawings in which:

FIGURE 3 is a vertical cross section in a substantially central plane transverse to that of FIGURES 1 and 2.

FIGURE 4 is a view, partly in elevation, and partly in cross section, taken along the line 4—4 of FIGURE 1, in reduced scale.

FIGURE 5 is a top view of FIGURE 4.

FIGURE 6 is a perspective view of the movable contact blade of the switch.

FIGURE 7 is an enlarged vertical cross section along the line 7—7 of FIGURES 3 and 5.

FIGURE 8 is an exploded perspective view of some of the moving parts of the switch mechanism.

Figure 1:
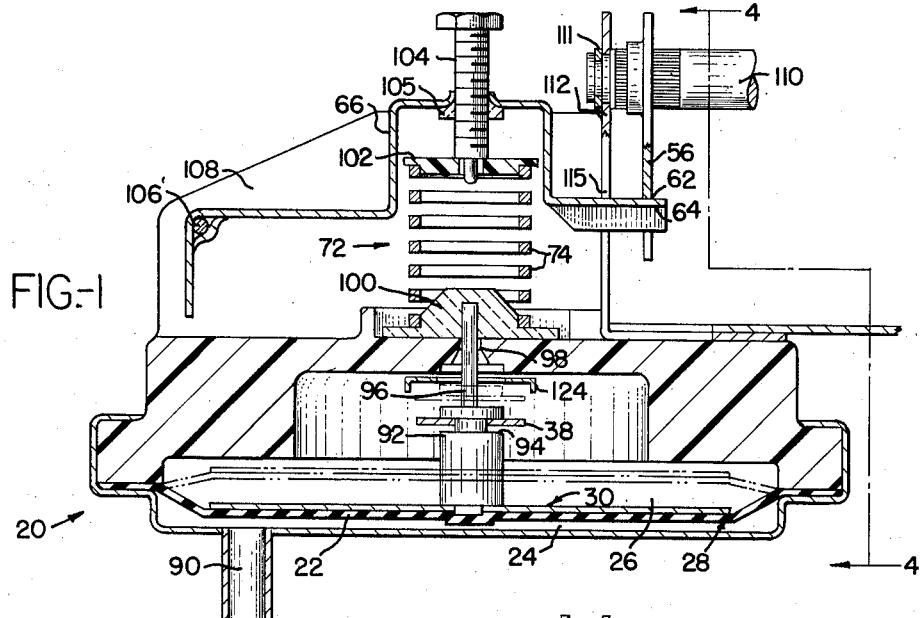
FIGURE 1 is a vertical cross section of the controller with the diaphragm and switch shown in undotted lines in the position produced when the washing machine tub is empty, and when the cam has been adjusted to a selected upper level position, and with the dotted lines indicating the positions of certain parts when the tub has been filled.

Certain words which describe direction, relative position, and the like are used herein for the sake of brevity and clearness. However, it is to be understood that such words apply only to the drawings and that the actual parts may be in entirely different direction or relative position. Words such as "upper," "vertical," "lower," "horizontal" are used in this manner.

A controller, such as a water level switch, according to this invention, may be provided with a diaphragm holding casing, frame, or the like 20. A diaphragm 22, which may be a variable fluid pressure responsive motor, or a variable condition responsive motor of any kind, may be provided in the casing 20.

The diaphragm 22 may separate the casing 20 to form a variable fluid pressure responsive chamber 24, and an atmospheric pressure responsive chamber 26. Hence, the diaphragm 22 has a variable fluid pressure responsive side 28 and an atmospheric pressure responsive diaphragm side 30.

A snap switch 32, shown in FIGURES 3 and 8, is operatively connected to the diaphragm 22, to be snapped by the diaphragm from a set or open water valve condition, with the movable contact 34 in engagement with the stationary contact 36 as shown in FIGURE 3. This condition is obtained when the variable fluid pressure produced in the chamber 24 is substantially at a generally low or minimum limit, such as when the tub is substantially empty. The diaphragm is also connected to the switch 32 so that it is snapped to an actuated condition or water valve closing condition with the movable contact 34 against the upper stationary contact 40 when the variable fluid pressure is at a selected upper pressure limit, such as when the water has reached any one of the selected three upper limits of "low," "medium," or "high."

The snap switch 32 may be provided with any well known elements, such as a movable contact blade 38 with a movable contact 34, stationary contacts 36 and 40, and a rolling C shaped snap spring 42. The stationary contact 40 may be connected to the timer connector 46, which may be connected to the timer 48, which in turn is connected to the line L". The other stationary contact 36 may be connected to the water valve connector 50, which in turn may be connected to the water valve 52, which is also connected to the line L". The feed line L' may be connected to the connector 44 which is connected to the movable blade 38 by pin 120. The construction is such that when the movable blade 38 is moved to its lower position, the feed line L' may be connected through 44, 38, 34, 36, 114, 116, and 50 to the water valve 52 and then to the line L". Under these conditions, the water valve 52 may be opened and will continue to be open as long as the contact 34 remains on stationary contact 36. Water will be fed to the tub, until the tub reaches the selected filled water level of "low," "medium" or "high." At this time the diaphragm 22 will actuate or push the blade 38 upwardly so that it snaps upwardly from the contact 36 and engages the contact 40. At this time the switch deenergizes or closes the water valve 52 and energizes the timer 48, so that the timer begins to operate and actuate any of the various switches, not shown, which produce the desired operations of the washing machine. The timer operating circuit is through L', 44, 120, 38, 40, 118, 46, 48 and L".

It is thus to be seen that a snap switch 32 has been provided which is operatively connected to the diaphragm 22, so that the switch may be snapped by the diaphragm 22 from a "set" or "reset" condition, with contact 34 against contact 36, when the tub is substantially empty and the variable fluid pressure in chamber 24 is substantially at a near minimum limit or empty limit. The switch 32 may also be moved to an actuated condition, with the movable contact 34 in contact with the upper stationary contact 40, when the water level or the variable fluid pressure reaches any one of the selected upper pressure or filled water level limits.

Adjusting cam means 56 may be provided having a plurality of selectable upper fluid pressure limit positions, such as the water level controlling notches 58, 60 and 62. These notches may be selectively moved to provide a plurality of selectable upper fluid pressure limit or filled water level positions. Adjustment to these positions causes the switch 32 to snap upwardly against contact 40 when the tub has been filled to the selected "low," "medium," and "high" filled water level. This adjustment is obtained when the notches 58, 60 or 62 are respectively adjusted to engage the end 64 of the lever 66.

Figure 2:
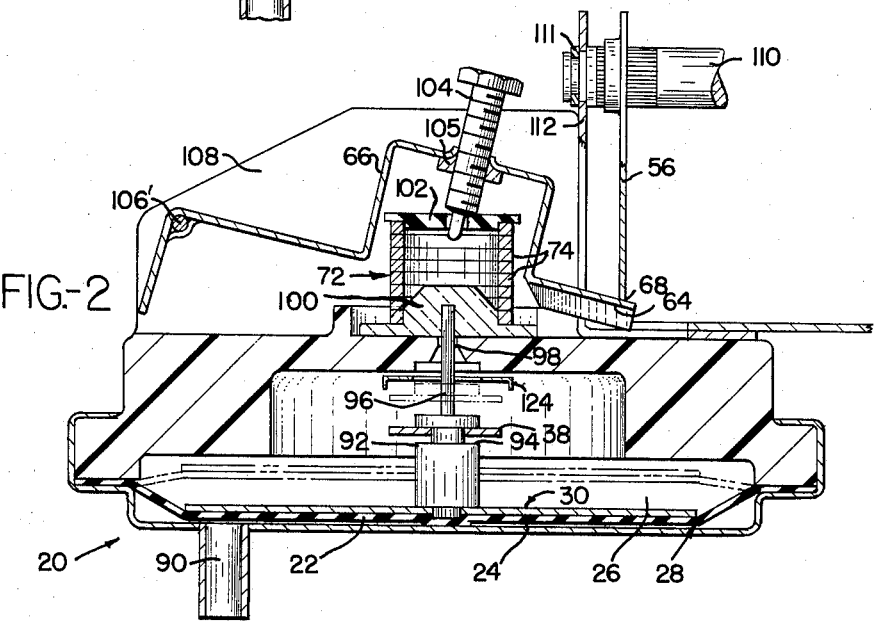
FIGURE 2 is a view similar to FIGURE 1, but showing the switch in the position at the instant of "resetting" the switch.

The cam means 56 has one or more resetting positions or detents 68 and 70 which may be between the notches which move the end 64 of the lever down to the "reset" position of FIGURE 2. This downward movement causes the switch 32 to be moved to the water fill or "reset" condition with the movable contact 34 against the lower contact 36. This resetting action can be produced even when the fluid pressure responsive chamber 24 is subjected to an upper pressure limit by a filled water condition of the tub.

That is, assume that the cam 56 has been adjusted to have "low" fill notch 62 engage the lever end 64, so that the tub has been filled to the selected "low" water level condition, and that the movable contact 34 has been snapped upwardly by the diaphragm 22 when the tub has been filled to the selected "low" level. Then assume that the user starts to adjust the cam means 56 to place the notch 60 over the end 64 of the lever 66. This will cause the detent 68 to push the lever end 64 down, as shown in FIGURE 2, and will cause the switch 32 to snap the contact 34 down against the lower contact 36. Then where continued adjustment of the cam 56 causes the notch 60 to arrive over the end 64, the contact 34 will remain in the "reset" condition with the contact 34 aganist the contact 36. The water switch 52 then can be energized to cause water to be added to the tub until the water level reaches the "medium" position.

A corresponding action will take place if the user first places the cam means 56 with the "medium" notch 60 over the lever end 64, and allows the tub to be filled to the selected "medium" water level, and he then wishes to adjust the cam 56 to place the "high" notch 58 over the end 64. Such adjustment will first cause the detent 70 to pass over the lever end 64 during such adjustment, and will push the end 64 down as in FIGURE 2, and this will "reset" the switch 32 with the contact 34 against the contact 36, so that the water valve 52 can be opened and the tub can be additionally filled from the previously selected "medium" level, to the newly selected "high" level.

According to this invention a single coil spring 72 can be interposed between the snap switch 32 and the cam means 56, which can produce the desired spring pressure to produce the desired fill level. Such single spring can also produce a positive downward pushing action, to insure that the snap switch 32 is moved down to a "reset" position when the cam 56 is in the resetting position with the detent 68 or 70 against the lever end 64, as illustrated in FIGURE 2.

Figure 9:
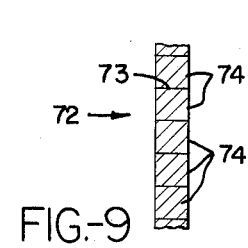
FIGURE 9 is a detail view showing the spring coils contacting each other.
Figure 10:
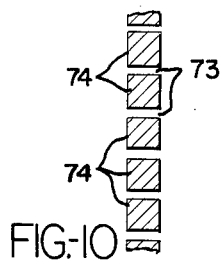
FIGURE 10 is a detail view showing the spring coils separated from each other.

To insure that the single coil spring 72 produces these desired results, the spring is provided with a plurality of coil loops 74 which are spaced apart, as in FIGURES 1 and 10 when the cam means 56 is in a selected upper limit position, such as when any of the notches 58, 60 or 62 are in engagement with the lever end 64. These coils 74 are contacting each other, as in FIGURES 2 and 9 when the cam means 56 is in the reset position, with the detents 68 or 70 engaging the lever end 64. With this condition, as shown in FIGURE 2, the single spring 72 exerts a positive resetting action which insures that the movable switch blade 38 is pushed down to move the movable contact 34 against the lower contact 36.

To insure that the loops 74 will not slip sidewise, the wire of the coil 72 may be made with parallel flat surfaces 73 where the coils are contacting or are to contact each other as illustrated in FIGURES 2, 9 and 10. Such wire may have a parallel sided cross section, such as a rectangular cross section, as illustrated in FIGURES 9 and 10.

It is thus to be seen that a diaphragm or variable fluid pressure responsive motor 22 has been provided. A switch 32 has been provided to be moved by the diaphragm or motor 22 from a "reset" condition, such as shown in FIGURE 2 when the fluid pressure in chamber 24 is substantially at a low or minimum limit, such as produced by an empty water tub. The switch 32 is also to be moved to an actuated condition, such as shown in dotted lines in FIGURE 1 when the fluid pressure in the chamber 24 is at a selected upper pressure limit. Adjusting cam means 56 has been provided having variably selectable upper pressure limit positions or notches 58, 60 and 62 to cause the switch 32 to be actuated to said actuated condition of dotted lines in FIGURE 1 in response to different upper pressure limit positions 58, 60 and 62 and having one or more resetting positions or detents 68 and 70 to cause said switch to be moved to said resetting condition, as shown in FIGURE 2 even when the fluid pressure in chamber 24 is substantially above such low or minimum limit, as when the tub of the washing machine is partially or fully filled with water. Under these conditions the coil spring 72 has loops 74 that are separated in FIGURES 1 and 10 and are in contact with each other as in FIGURES 2 and 9, under conditions heretofore described.

It is to be noted that the snap switch 32 may also be of any other type of switch, or other type of energy controller, which controls the flow of energy other than electricity, such as gas or the like.

The water level in the washing machine tub may cause varying air pressures in a tube, 77, FIGURE 4, in a well known manner, which may be connected to the connector 90 to produce varying air pressures in chamber 24 responsive to, or representative of, the water level in the washing machine tub. The diaphragm 22 may be connected with a relatively thick actuating member 92 which is solid and has a notch 94 which receives the movable blade 38 of the switch 32. A rod extension 96 of member 92 passes through an opening 98 in the upper part of the casing 20 and supports a lower disc 100 which receives the lower end of the spring 72. An upper disc 102 is loosely connected to a screw 104 which threadedly engages the lever 66 for adjustment of the compression of spring 72 at the factory to obtain the desired responses to the pressures produced in chamber 24. A lock nut 105 holds the screw 104 in adjusted position. The lever 66 is fulcrumed by a pin 106' which extends between the two casing shoulders 108.

The cam 56 may be rotatably adjusted by, and may be mounted on, a horizontal rotatable adjusting rod 110 which may have an adjusting knob, not shown, at its other end. The rod 110 may have a bearing 111 on the bracket 112, which bracket may be mounted on the casing 20 by screws 126, FIGURE 5, and also may be supported by any part of the washing machine, as desired. Another bearing member, somewhat similar to 111 may extend from the bracket 112 to the rod 110 rightward of FIGURE 1, and adjacent the adjusting knob just described. The longer detents 113 at the ends of the cam 56 limit the rotational movement of the cam 56, which is therefore limited to a back and forth rotational movement. The bracket 112 has a vertical opening 115 through which the end 64 of the lever passes. The opening 115 limits sidewise movement of the lever end 64.

In FIGURE 8, the contact 36 is connected by a flat piece 114 and a rivet pin 116 to the connector 50. The contact 40 is connected by a rivet pin 118 with the connector 46. The connector 44 is connected by the rivet 120 with one end of the snap switch blade 38.

The responses of the snap switch 32 may be adjusted by an adjusting screw 122 in casing 20, FIGURE 3, which bears downwardly on the stiff adjustable blade 124. The blade 124 has a tongue which receives one end of the C spring 42, while the tongue 126 of the movable blade 38 receives the other end of the C spring 42. Any other type of well known snap switch may be used in lieu of switch 32, as desired.

One of the advantages of the positive downward push produced by the contacting spring loops 74 shown in FIGURES 2 and 9 is that any upward surge of pressure produced by water in tube 77 cannot accidentally actuate the movable blade 34 upward during the resetting operation. Such surge may be transmitted through the connector 90 during the reseting operation but it cannot produce an upward surge in the spring 72, or the disc 100, rod 96 and connector 90 and move the diaphragm 24 upward to actuate the switch 32 upwardly prematurely, as long as the spring coils 74 are in the condition shown in FIGURES 2 and 10.

There are many other forms of pressure apparatus which can be provided with the single spring construction 72 herein disclosed to produce the positive thrust in one adjusting position, such as in the resetting operation of FIGURES 2 and 9 and to provide the resilient pressure responsive necessary when the coils 74 are separated as in FIGURES 1 and 10 to be effective to operate the switch in response to variable pressures.

In FIGURES 1 and 10 the spring coils 74 are spaced apart in readiness to provide resilient responses to the diaphragm 22, whereas in FIGURES 2 and 10 the spring coils 74 are engaging each other in readiness to produce an unyielding and positive thrust of an unresilient character, to produce a resetting operation and the like. Thus, in FIGURE 1, the controlling device is capable of being responsive to varying pressures in chamber 24, whereas in FIGURE 2, the construction is producing a positive resetting action which positively pushes the switch 32 downward to its lower or reset position without any resiliency in the spring 72.

It is thus to be seen that a pressure responsive controller has been provided which is capable of being responsive to various pressure and other varying conditions under certain setting adjustments, and is capable of producing a positive resetting or unresilient action under other adjustment positions.

A new, efficient, low cost energy controller and method have thus been provided.

While the form of the invention now preferred has been disclosed as required by statute, other forms may be used, all coming within the scope of the claimed subject matter which follows.

What is claimed is:

1. In combination: a diaphragm holding casing; a diaphragm in said casing forming a variable fluid pressure responsive chamber and an atmospheric pressure responsive chamber on opposite sides of said diaphragm; a snap switch with operating means operatively connected to said diaphragm to cause said switch to be snapped by said diaphragm from a set condition when said variable fluid pressure is substantially at a generally low limit to an actuated condition when said variable fluid pressure is at a selected upper pressure limit; adjusting cam means having a plurality of selectable upper fluid pressure limit positions to cause said switch to be actuated in response to different upper fluid pressure limits and having a resetting position to cause said switch to be moved to said set condition while said fluid pressure responsive chamber is at an upper pressure limit; and a coil spring means interposed between said snap switch and said cam means having a plurality of coil loops which are spaced apart when said cam means is in a selected upper limit position and which loops are all contacting each other when said cam means is in said reset position while said pressure responsive chamber is at an upper pressure limit.

2. In combination: a frame; a diaphragm in said frame having a variable fluid pressure responsive diaphragm side and an atmospheric pressure responsive diaphragm side; a switch with operating means operatively connected to said diaphragm to cause said switch to be moved by said diaphragm from a condition when said variable fluid pressure is substantially at a low limit to an actuated condition when said variable fluid pressure reaches a selected upper pressure limit; adjusting cam means having variably selectable upper pressure limit positions to cause said switch to be actuated in response to different upper pressure limits and having a resetting position to cause said switch to be moved to said set condition when said fluid pressure responsive diaphragm side is at a pressure substantially above said low limit; and a coil spring interposed between said switch and said cam means having a plurality of coil loops which are spaced apart when said cam means is in a selected upper pressure limit position and which loops are all contacting each other when said cam means is in said resetting position while said pressure responsive diaphragm side is at a pressure substantially above said low limit.

3. In combination: a variable fluid pressure responsive motor; a switch with operating means operatively connected to said motor to cause said switch to be moved by said motor from a set condition when said fluid pressure is substantially at a low limit to an actuated condition when said fluid pressure is at a selected upper pressure limit; adjusting cam means having variably selectable upper pressure limit positions to cause said switch to be actuated to said actuated condition in response to different upper pressure limit positions and having a resetting position to cause said switch to be moved to said set condition when said fluid pressure is at a pressure substantially above said low limit; and a coil spring interposed between said switch and said cam means having a plurality of coil loops which are spaced apart when said cam means is in said selectable upper pressure limit positions and which loops all contact each other when said cam means is in said resetting position while said fluid pressure is at a pressure substantially above said low limit.

4. In combination: a diaphragm holding casing; a diaphragm in said casing separating said casing into a lower variable fluid pressure responsive chamber and an upper atmospheric pressure responsive chamber on opposite sides of said diaphragm; a snap switch with operating means operatively connected to said diaphragm to cause said switch to be snapped by said diaphragm from a set condition when said variable fluid pressure is substantially at a generally lowest limit to an actuated condition when said variable fluid pressure is at a selected upper pressure limit; a connecting rod connected to said diaphragm and extending up through an opening in said casing and having a spring receiving disc attached thereto above said casing; an adjusting lever pivoted above said spring receiving disc and having a fulcrum on one side of said disc, and an actuating end on the other side of said disc and an adjusting screw carried by said lever above said disc; an upper spring receiving disc loosely connected to said adjusting lever and adjusting screw; and a coil spring interposed between said discs; an adjusting cam having a plurality of selectable upper fluid pressure limit producing notches engaging the end of said lever and having at least one resetting detent between said notches, so that adjustment of said cam to any of said notches selects the upper pressure fluid limit of said switch and adjustment of said cam from one notch to another notch causes said detent to depress said lever to a resetting position to cause said switch to be moved to said set condition while said fluid pressure responsive chamber is at an upper pressure limit; said coil spring having a plurality of coil loops which are spaced apart when said cam is in a selected upper limit notch position and which loops are all contacting each other when said cam is in said reset position while said pressure responsive chamber is at an upper pressure limit.

5. A combination according to claim 4 in which said coil spring has parallel flat surfaces where said loops are contacting each other.

6. A combination according to claim 4 in which said coil spring has a parallel sided cross section.

7. A combination according to claim 4 in which said coil spring has a rectangular cross section.

8. In combination: a variable condition responsive motor; an energy controller with operating means operatively connected to said motor to cause said controller to be moved by said motor from a set station when said variable condition is substantially at a low limit to an actuated station when said variable condition is at a selected upper limit; adjusting means having variably selectable upper limit positions to cause said energy controller to be actuated to said actuated station in response to upper pressure limits and having a resetting position to cause said energy controller to be moved from said set station when said variable condition is at a condition substantially above said low limit; and a coil spring interposed between said energy controller and said adjusting means having a plurality of coil loops which are separated apart when said adjusting means is in said selectable upper limit positions and which loops all contact each other when said adjusting means is in said resetting position while said variable condition is at a condition substantially above said low limit.

9. In combination: a coil spring having first and second ends and a plurality of coil loops which are spaced apart when the ends of said spring are subjected to a plurality of different first named pressures and which coil loops contact each other when said ends are subjected to a second named pressure which is sufficient to cause all of said loops to contact each other; switch means connected to said first end; and control means connected to said second end to subject said ends to said plurality of different first named pressures to move said second end a greater distance than said first end, and to subject said ends to said second named pressure to move said ends an equal distance.

References Cited by the Examiner

UNITED STATES PATENTS

| | | | |
|---|---|---|---|
| 1,398,060 | 11/1921 | Beck. | |
| 1,523,225 | 1/1925 | Lukens | 267—61 X |
| 2,136,908 | 10/1938 | Pierce et al | 267—61 X |
| 2,179,599 | 11/1939 | Raney | 200—83 |
| 2,636,093 | 4/1953 | Clark et al. | 200—83 |
| 2,700,540 | 1/1955 | Juhasz | 267—61 X |
| 2,934,618 | 4/1960 | Beller et al. | 200—83 |
| 3,064,094 | 11/1962 | Marchi | 200—83 |
| 3,140,365 | 7/1964 | Voland | 200—16 |

BERNARD A. GILHEANY, *Primary Examiner.*

H. M. FLECK, *Assistant Examiner.*